Figure 1:
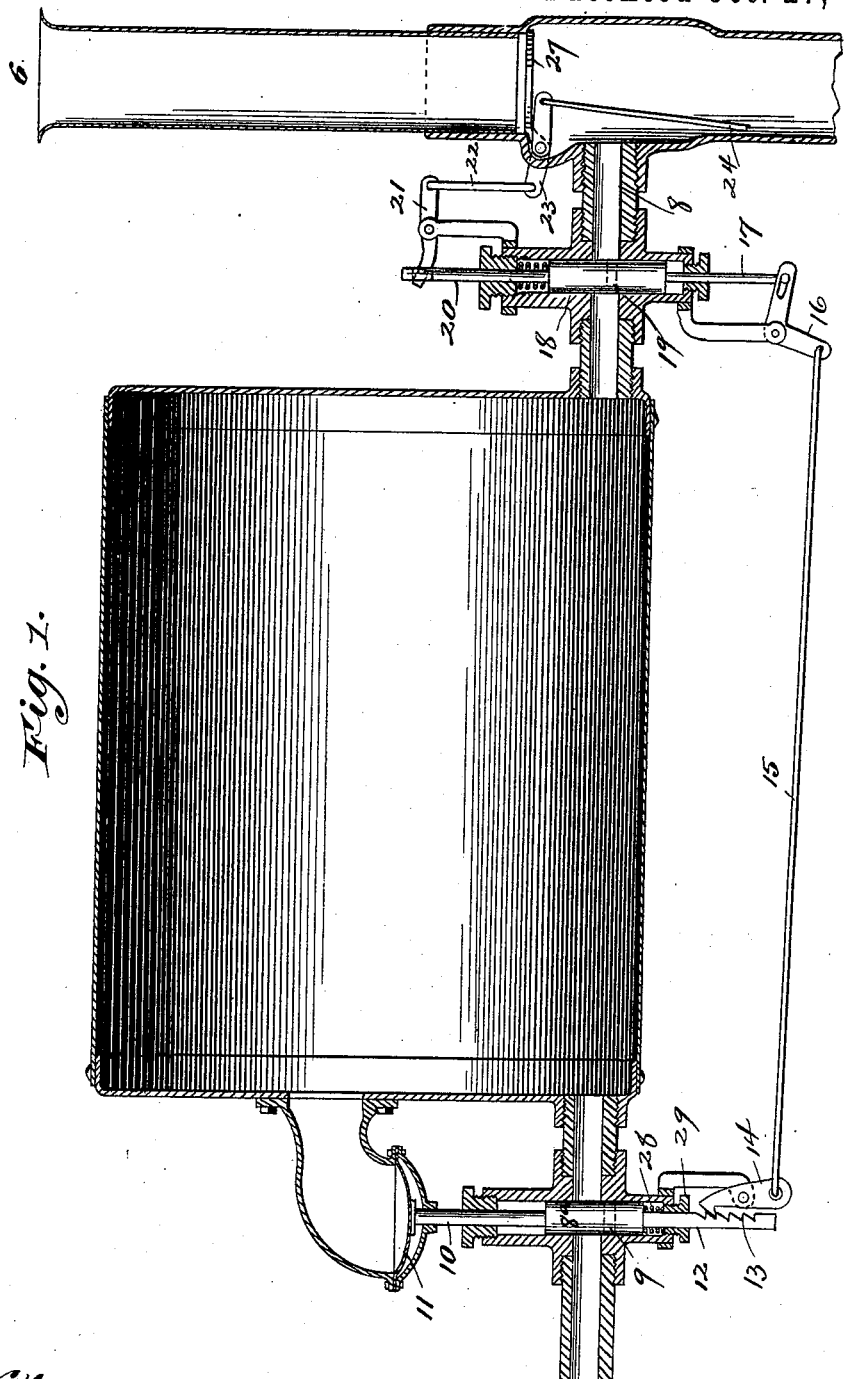

(No Model.) 2 Sheets—Sheet 1.

E. A. FORDYCE.
MEANS FOR CONTROLLING SUPPLY OF MOTOR FLUID.

No. 570,162. Patented Oct. 27, 1896.

Witnesses,
S. Mann,
Frederick F. Goodwin

Inventor,
Edmund A. Fordyce
By Offield, Towle and Linthicum,
Attys.

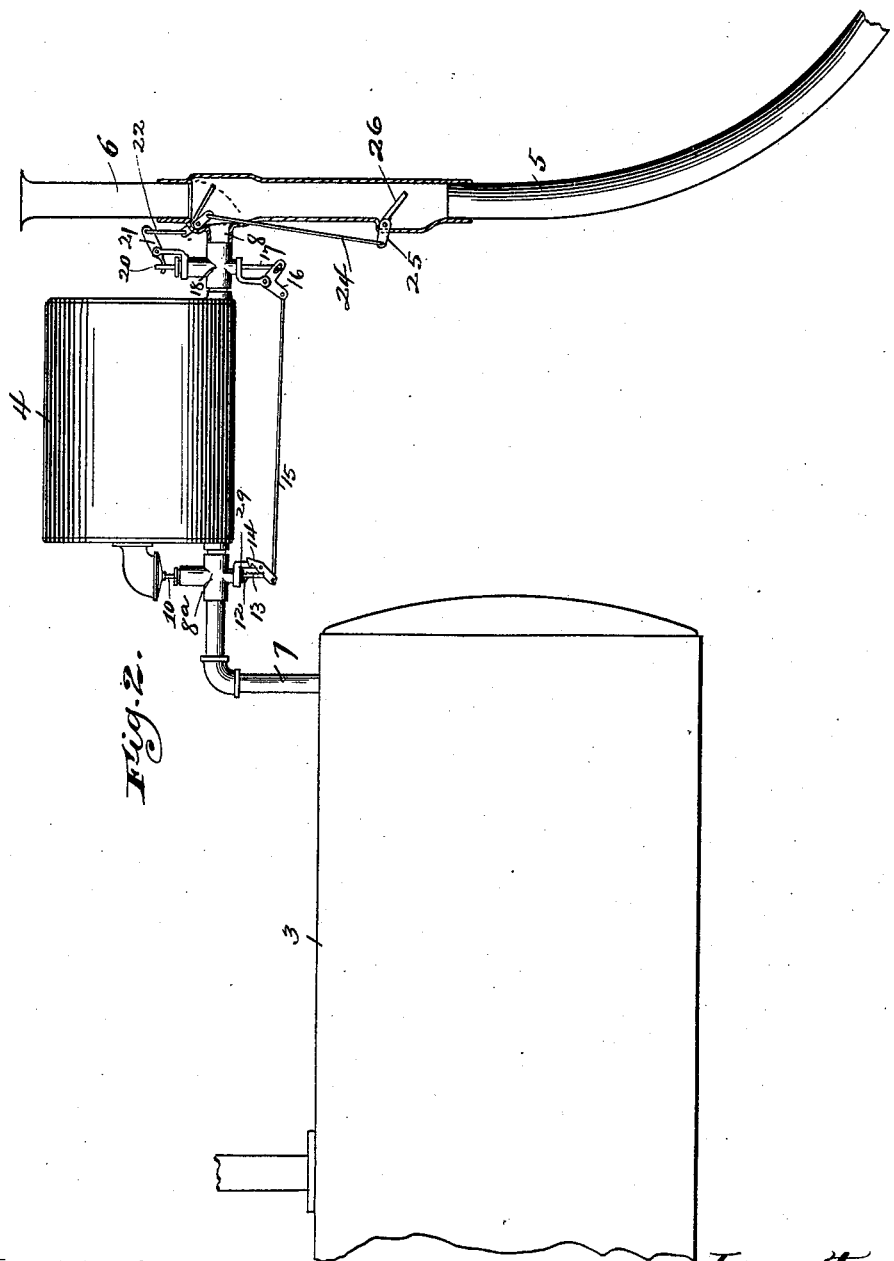

UNITED STATES PATENT OFFICE.

EDMOND A. FORDYCE, OF CHICAGO, ILLINOIS.

MEANS FOR CONTROLLING SUPPLY OF MOTOR FLUID.

SPECIFICATION forming part of Letters Patent No. 570,162, dated October 27, 1896.

Application filed July 29, 1895. Serial No. 557,499. (No model.)

*To all whom it may concern:*

Be it known that I, EDMOND A. FORDYCE, of Chicago, Illinois, have invented certain new and useful Improvements in Means for Controlling the Supply of Motor Fluid, of which the following is a specification.

This invention relates to means for controlling the supply of a motor fluid and may be used for many purposes, but is particularly adapted to control the supply of a motor fluid in a pneumatic-despatch apparatus, and it is this utilization of my invention which I have shown in the accompanying drawings, in which—

Figure 1 is a sectional elevation, and Fig. 2 a side elevation.

In carrying out my invention I employ two reservoirs, of which the main reservoir is marked 3 and the auxiliary reservoir 4.

5 represents a despatch-tube, which may have a receiving-spout 6.

7 represents a pipe connecting the main reservoir with the auxiliary reservoir, and 8 a pipe connecting the auxiliary reservoir with the tube. The auxiliary reservoir is intended to contain a sufficient quantity of air and under sufficient pressure for a single operation or actuation of the device, and hence the valves are so arranged that each time a carrier is deposited the auxiliary-reservoir pressure is utilized to send the carrier, and then said reservoir is recharged from the main reservoir. To accomplish this, I employ a valve controlling the passage in the pipe 7, this valve being marked $8^a$ and having a transverse port 9, and an upwardly-extending stem 10 entering a diaphragm-chamber, the diaphragm of which is marked 11. The valve has a depending stem 12, provided with ratchet-teeth 13, and a locking-pawl 14 is adapted to engage said teeth. This pawl is connected by a rod 15 with a bell-crank 16, one arm of which is made fast to the depending stem 17 of the valve 18, controlling the passage in the pipe 8. This valve has also a transverse port 19 and an upwardly-extending stem 20, with which a pivoted lever 21 engages. Said lever has a link 22, connected to a pivoted bar 23, which is connected by a link 24 to the crank 25 on a trip 26, which trip is located within the despatch-tube and in position to be engaged by a passing carrier. A valve 27 is made fast to the pivot of the bar 23, and said valve will be driven off its seat by the dropping of a carrier into the despatch-tube.

The operation of sending a carrier is as follows: If the carrier be deposited in the despatch-tube, it will strike the trip 26 and through its crank 25, rod 24, bar 23, link 22, and lever 21 will raise the valve 18 into a position to admit air through the pipe 8 from the auxiliary reservoir. As the charge of air flows in it will force the carrier past the trip 26, thus causing the valve, through the instrumentalities above named, to be opened, thus admitting a full charge of auxiliary-reservoir pressure behind the carrier. The lifting of the valve 18 will operate through the bell-crank 16 and rod 15 to lock the valve $8^a$ in its closed position. As the auxiliary reservoir becomes exhausted the valve 27 will fall from its seat, and by reason of its connection with the pivot of the bar 23 will rock said bar and through the means above described close the valve 18 and release the valve $8^a$, which will then be returned to its normal position by means of the spring 28. Air will then flow from the main reservoir to the auxiliary reservoir until the pressure in the two reservoirs becomes equalized. As the air accumulates in the auxiliary reservoir it will act upon the diaphragm 11 to close the valve 8. The apparatus is calculated to operate even with a slight difference of pressure in the two reservoirs, and this can be accomplished by adjusting the tension of the spring 28 by means of the adjusting-nut 29.

I have not shown the discharge end of the despatch-tube, as the particular construction thereof is not material to my invention. The discharge end may be left open and provided with a suitable guide or terminate in a suitable receptacle for the carriers. This apparatus is designed particularly for the despatch of large carriers in pneumatic subways, and can be used to advantage for transporting heavy or large carriers.

Of course the kind of valves and the particular form of connecting the valves may be greatly varied. I have provided means whereby they are rendered entirely automatic, so that the mere placing of a carrier in the despatch-tube will operate to admit air for its despatch, and after the depletion of the auxiliary reservoir it will be refilled by the automatic action of the valve 27.

I claim—

1. A pneumatic-despatch apparatus, comprising in combination with the despatch-tube a main pressure-reservoir and an auxiliary reservoir, the latter being interposed between the main reservoir and the despatch-tube and in communication with both, valves controlling the communicating passages and a tripping device projecting into the despatch-tube and adapted to be moved by a passing carrier to operate to open the valve between the reservoir and the despatch-tube, substantially as described.

2. A pneumatic-despatch apparatus, comprising in combination with the despatch-tube a main reservoir and an auxiliary reservoir, the latter being located between the former and the despatch-tube and communicating with both, valves in the communicating passages, a tripping device located in the despatch-tube and adapted to be moved by a passing carrier, connections between said tripping device and the valve in the passage between the auxiliary reservoir and the despatch-tube and adapted when actuated to open the valve for controlling the passage from the main reservoir to the auxiliary reservoir and a locking mechanism for said valve in the passage-way between the reservoirs and actuated by the valve in the passage-way from the auxiliary reservoir to the despatch-tube, substantially as described.

3. A pneumatic-despatch apparatus, comprising in combination with the despatch-tube a main reservoir for a pressure fluid and an auxiliary reservoir interposed between said main reservoir and the despatch-tube and communicating with both, valves controlling the passages, springs normally tending to move the valves in one direction and a diaphragm subject to auxiliary-reservoir pressure and normally tending to close the valve controlling the auxiliary-reservoir supply, substantially as described.

4. A pneumatic-despatch apparatus, comprising in combination a despatch-tube, a reservoir, a valve interposed in the passage-way between the reservoir and the despatch-tube, a valve in the despatch-tube and a trip also arranged in the despatch-tube and adapted to be moved by a passing carrier and connections between the trip and the valves in the despatch-tube and in the passage-way, whereby when a carrier is deposited the valve controlling the supply-passage is opened, substantially as described.

5. A pneumatic-despatch apparatus, comprising in combination a despatch-tube, a reservoir, a valve interposed in the passage-way between the reservoir and the despatch-tube, a valve in the despatch-tube, a trip also arranged in the despatch-tube and adapted to be moved by a passing carrier, connections between the trip and the valves in the despatch-tube and in the passage-way, whereby when a carrier is deposited the valve controlling the supply-passage is opened, and the valve in the despatch-tube being connected with the valve controlling the passage-way and adapted by its weight to close said valve upon the release of pressure in the despatch-tube, substantially as described.

EDMOND A. FORDYCE.

Witnesses:
C. C. LINTHICUM,
FREDERICK C. GOODWIN.